Oct. 10, 1944.　　P. E. NOKES ET AL　　2,359,934
AREA MEASURING MACHINE
Filed Oct. 1, 1942　　7 Sheets-Sheet 1

INVENTORS
Philip E. Nokes
Paul Cohen
By their attorney

Oct. 10, 1944.  P. E. NOKES ET AL  2,359,934
AREA MEASURING MACHINE
Filed Oct. 1, 1942  7 Sheets-Sheet 3

Oct. 10, 1944.  P. E. NOKES ET AL  2,359,934
AREA MEASURING MACHINE
Filed Oct. 1, 1942  7 Sheets-Sheet 4

Oct. 10, 1944.      P. E. NOKES ET AL      2,359,934
AREA MEASURING MACHINE
Filed Oct. 1, 1942      7 Sheets-Sheet 5

INVENTORS
Philip E. Nokes
Paul Cohen
By their attorney

Oct. 10, 1944.   P. E. NOKES ET AL   2,359,934
AREA MEASURING MACHINE
Filed Oct. 1, 1942   7 Sheets-Sheet 6

INVENTORS
Philip E. Nokes
Paul Cohen
By their attorney

Patented Oct. 10, 1944

2,359,934

UNITED STATES PATENT OFFICE 2,359,934

AREA MEASURING MACHINE

Philip E. Nokes and Paul Cohen, Beverly, Mass., assignors to United Shoe Machinery Corporation, Flemington, N. J., a corporation of New Jersey Application October 1, 1942, Serial No. 460,402

16 Claims. (Cl. 33—123)

This invention relates to methods of and machines for measuring sheet material and is herein exemplified by reference to a machine for measuring the area of hides and skins. It is to be understood, however, that in various novel and useful aspects the invention is not limited to use in machines of the illustrated type.

The purely mechanical type of area-measuring machines, now in commercial use, commonly includes rotary members driven by the work piece undergoing measurement in an arrangement in which each rotary member measures its path across the work piece (in terms of its own circumference), the summation of the paths made by all the rotary members serving as a basis for calculating the area of the work piece. In the case of those work pieces which lie flat upon a plane surface, the results of the measuring operation are fairly satisfactory from the practical standpoint. However, many work pieces, such as glazed kid and calf skins, do not lie flat upon a plane surface but, on the contrary, show rippled or wavy portions indicating a fullness, particularly in the flank and belly portions of the skins, it being recalled in this connection that hides and skins come from barrel-shaped bodies. In order to measure the full portions or skirts of these skins it has been common practice when operating machines of the type mentioned above to hold back on, and thus retard, the middle flat portions of the skin, thereby permitting the skirts at each side to travel a little faster than the flat portions, whereby the skirts are fully extended and thus measured with a fair degree of accuracy. However, there is always some degree of stretching and distortion involved in these operations.

It has also been proposed to measure hides and skins by scanning methods, for example, by means of a beam or beams of light traveling across a work piece from side to side, the results being recorded with the aid of photoelectric cells in suitable circuits. Several kinds of such machines have been designed which are quite satisfactory where the work pieces lie flat upon the work supporting or work backing surface. It is obvious, however, that the area measured, in those cases in which the work piece is stationary on a work backing or supporting member, is always the equivalent of the projection of the work piece upon the work supporting or work backing surface. Hence the results are not accurate in certain classes of work and particularly in relation to glazed kid and calf skins which do not lie flat, for the reasons given above.

It is an object of this invention to provide for accurate measurement of all kinds of hides and skins and particularly of those which normally present wavy and rippled portions, it being understood that the invention has a more general application to include, for instance, the measurement of surfaces mathematically known as warped surfaces.

From one viewpoint, the invention resides in a method of measuring sheet material having a plane and/or a warped surface which includes tracing on the surface of a work piece lines corresponding to successive intersections with said surface of equally spaced mutually parallel planes which are substantially normal to such surface and then measuring the total length of screen images of these lines as traced on the surface of the work piece.

Essentially, the principle of measurement is to trace a contour line over the surface of the work piece. This line is seen by a lens whose optical axis is parallel to the work support and perpendicular to the contour line. The lens projects an image on a screen whose plane is perpendicular to the work support and parallel to the contour line. Thus the image, as traced, is a true reproduction (theoretically) of the contour line and the length of that image is exactly proportional (theoretically) to the length of the contour line.

In order to measure the real length of the image, as traced, in a rapid and practical manner, we divide up the work of measurement into two parts. The image traced by the aforementioned lens is used to obtain the amount of vertical deviations in the contour line, since such deviations are shown here without distortion. The image traced by another lens, whose optical axis need only be substantially perpendicular to the contour line, is measured to obtain the projected length of the line. Knowing the real length of each contour line and the spacing between successive lines, it is only a matter of summation to obtain the real area of a warped surface.

In accomplishing the desired result, a beam of light is provided which traces a path across a work piece of the kind specified during which time it travels up and down over wavy or warped portions and is reflected in a path upon a screen, thereby making it possible to obtain the full length of the line or path on the work piece. It has been found that a single beam of light traveling over the surface of a work piece may be made so bright as to insure reflection of an amount of light, even from difficult surfaces such as that provided by black suede, amply sufficient to produce successive light impulses in a suitably placed photoelectric cell thereby to make an accurate record of the path of the scanning beam.

According to one method of securing impulses in the photocell and its associated circuits, a screen is provided having a surface characterized by alternately arranged transparent and opaque bars or lines so that as a beam of light, directed by a suitably placed lens, travels lengthwise of said screen, it passes through the transparent bars or lines and is obstructed by the opaque bars or lines, whereby impulses are produced in the photocell and in associated electric circuits, it being understood in this connection that such impulses may be readily counted by means provided for that purpose. Such an arrangement as that just described would, if the lines or bars on the screen be vertically arranged, measure a line on a flat surface or the projection of a wavy or warped line-like portion of a work piece. To measure a line passing over wavy or rippled portions of a work piece, a screen should be provided to include a similar arrangement of transparent and opaque lines extending substantially in parallelism with the work-supporting surface so that, as the scanning beam moves upwardly and then downwardly over a wavy portion of a work piece, a corresponding beam reflected from the work piece will be projected to move up and down across a corresponding number of the parallel bars or lines on the screen, the beam passing through the transparent bars or lines and being interrupted by the opaque bars or lines to produce impulses in the photocell circuit as in the first arrangement described above. In this way, the height of any given wave or undulation in the surface of the skin would be recorded in accordance with the number of alternate light and dark lines or bars traversed by the reflected beam on the surface of the screen. In the illustrated construction, separate screens are provided with their associated reflecting lenses and photocells. One of these units, including lens, screen, and photocell, will measure always the projected length of a line across the work piece while the other unit will simultaneously measure only the up-and-down portions of the path of the same beam, the impulses made by the latter in connection with its special screen being accumulated and subsequently counted into the total of impulses produced in connection with the first screen and its associated photocell.

In the illustrated construction, a carriage is provided for supporting and moving a scanning mechanism relatively to a work piece stationary with respect to a work backing or work supporting member. As shown, the scanning mechanism comprises means for producing a beam of light and causing it to travel in successive parallel paths across a work piece together with means for directing rays of light reflected from such beam to two or more photocells each having a screen associated therewith to provide the impulses which will vary in number with the length of the path traveled by such light beam. It is proposed to use two or more scanning units spaced from each other in the direction of the length of the scanned line on the work piece where the width of the latter requires a plurality of units, it being understood in this connection that the beam in a part of its path may be reflected simultaneously into the photocells of two of the units, the result being that such units will receive and transmit the same number of impulses, although of about twice the intensity that one unit would normally receive.

These and other important characteristics and features of the invention and novel combinations of parts will now be described in detail in the specification and then pointed out more particularly in the appended claims.

Figure 4:
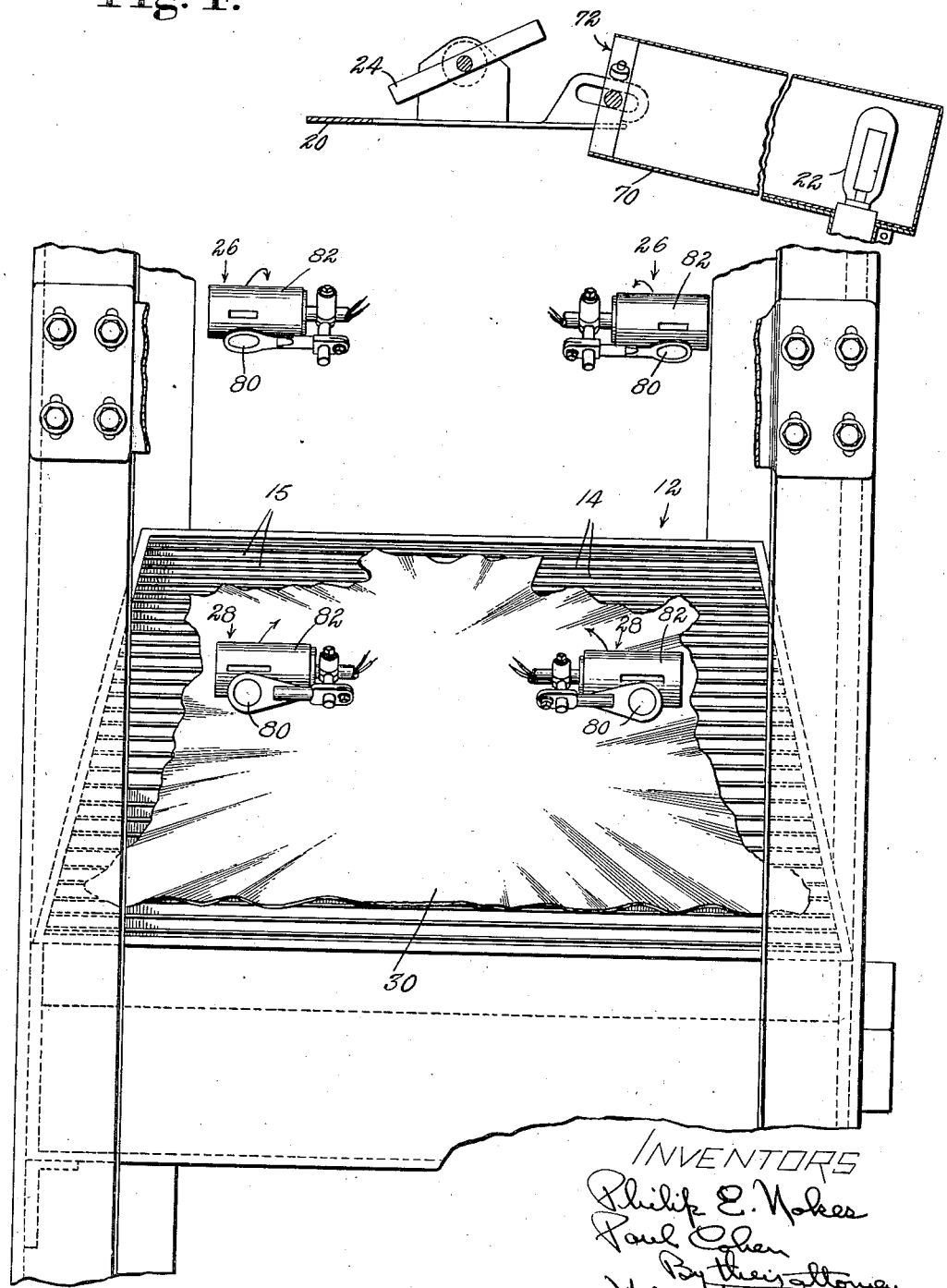
Fig. 4 is a view in parallel perspective, illustrating the relationship of the important elements of the machine as viewed upon looking into the cabinet from the left in Fig. 1.
Figure 5:
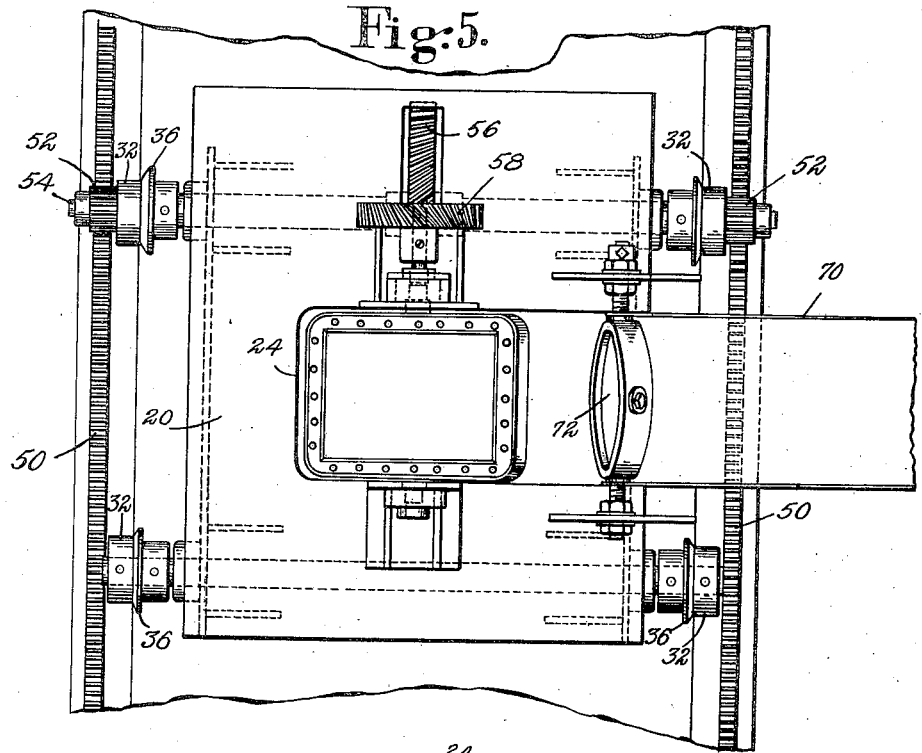
Fig. 5 is a top plan view of the carriage and of the mirror carried thereby.
Figure 6:
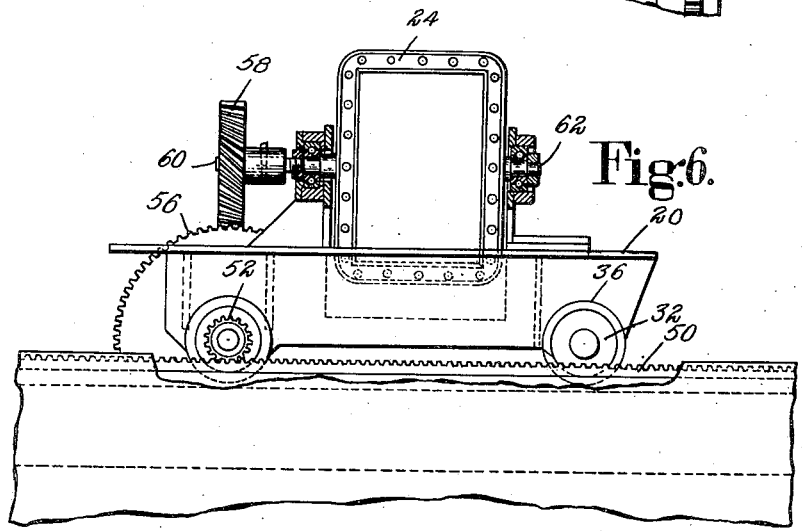
Fig. 6 is a side view, partly broken away, looking from the left in Fig. 5.

In the illustrated machine, which is specially designed for the measurement of sheet material such as tanned hides and skins, there is provided a cabinet 10 in the lower part of which is a work support indicated by the reference character 12 and made up of spaced parallel slats 14 upon the upper edges of which a skin may be spread out as shown in Fig. 4. As will be hereinafter pointed out, the parallel spaces or slots 15 between the said slats 14 constitute an important feature of the invention.

Mounted on a carriage 20 for movement along the top part of the cabinet is a scanning mechanism comprising a lamp 22 and a mirror 24 arranged to reflect a beam of light from the lamp upon a work piece on the table 12 and to cause said beam to sweep across the table in successive parallel paths, there being also supported by the carriage downwardly extending arms 25 to which are secured two pairs of upper and lower photocell units 26, 28 (Figs. 3 and 4) for receiving beams of light reflected from the work piece, which in this case is a glazed kid skin 30.

Figure 1:
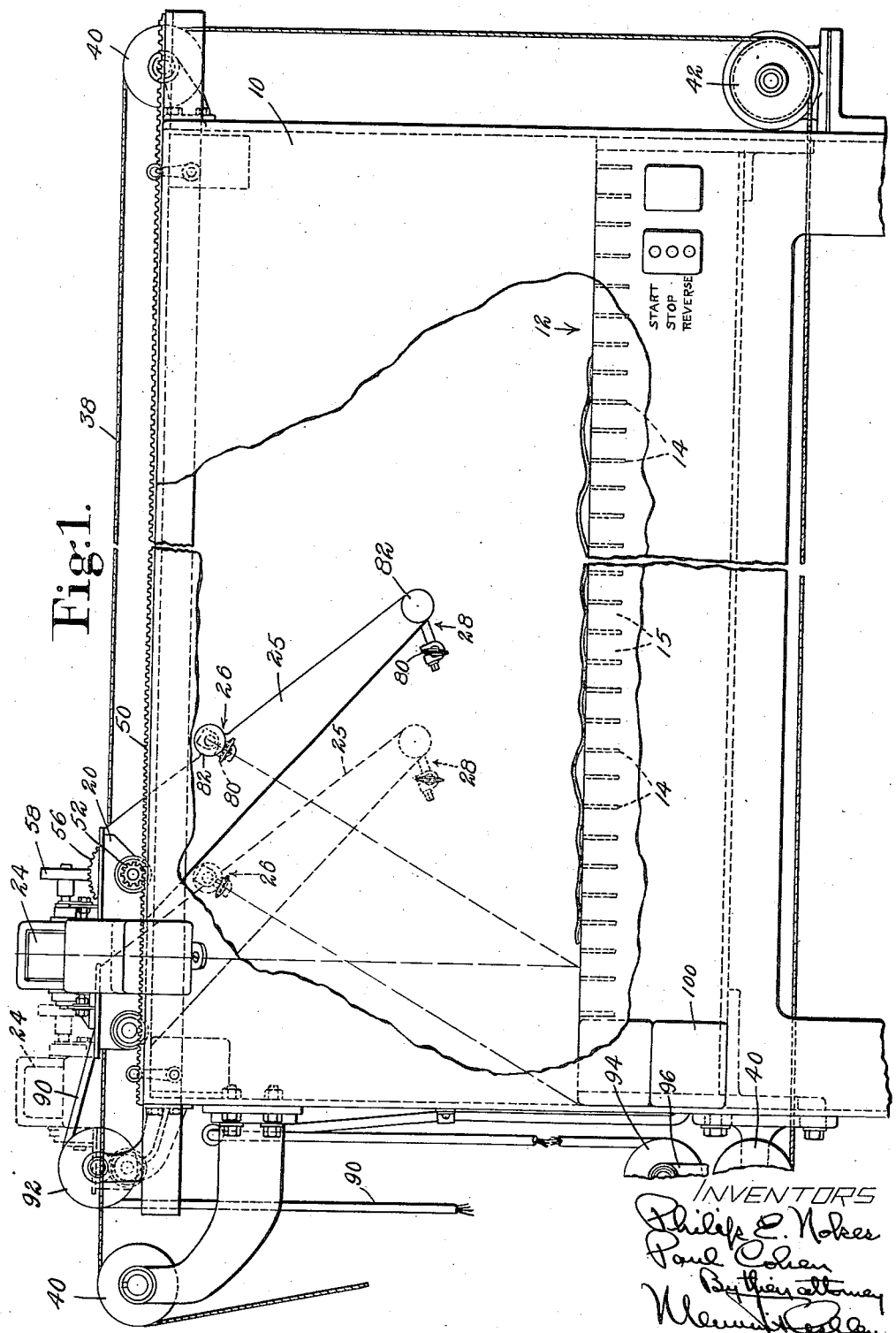
Fig. 1 is a view in side elevation, with part of the cabinet broken away, of an area measuring machine illustrating one embodiment of the invention.
Figure 2:
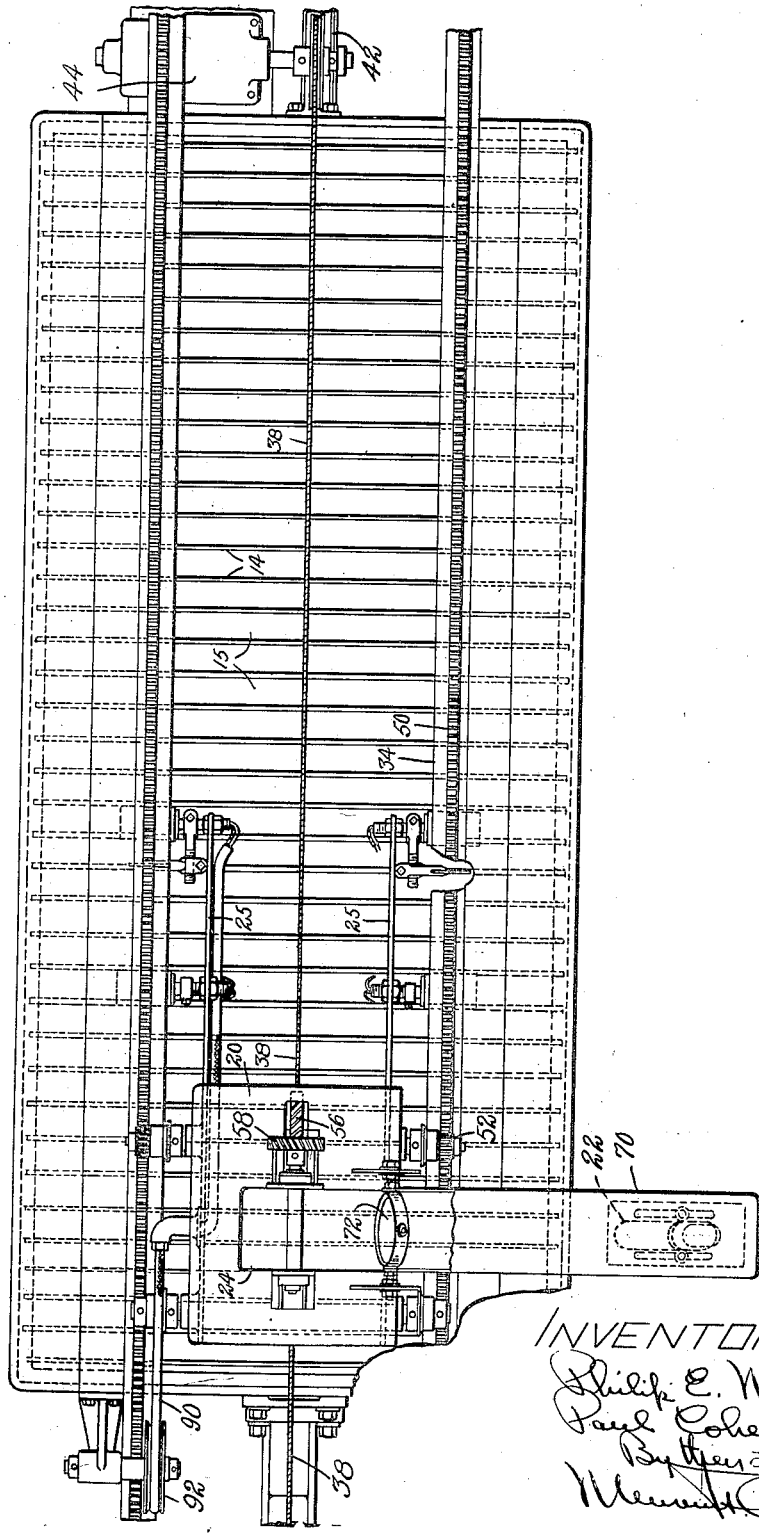
Fig. 2 is a top plan view of the machine shown in Fig. 1.

Since the scanning beam of light must travel in successive paths across the skin 30, it is clear that either the work support or the scanning mechanism must be moved relatively to the other. In the present construction, the scanning mechanism is made movable through the provision of means for operating the carriage 20. As shown, said carriage is provided with rollers 32 (Figs. 1, 2, 3, 5 and 6) which travel along on guideways 34 extending in parallel relation to each other at the top of the cabinet, the said rollers having flange portions 36 to engage the inner side edges of the guideways 34 to prevent lateral movement of the carriage while it is traveling back and forth on said guideways. Connected to the carriage 20 is a cable 38 which is arranged to pass over grooved pulleys 40 at three corners of the cabinet 10 and over and around a drum 42 at the fourth corner, said drum being arranged to be driven first in one direction to cause movement of the carriage during a scanning operation and then in the opposite direction to return said carriage to its initial position, the moving means for the drum being conveniently a reversible electrical motor 44 (Fig. 2) of a well-known type.

As heretofore stated, the mirror 24 is caused to reflect a beam of light in successive paths across the work piece, it being important in this connection that the beam of light should travel along the spaces 15 between the rods or slats 14 in the work support so that no reflection will come from the work support but only from the work piece resting on the slats or rods 14. It follows that the mirror 24 should be operated in such timed relation to the movement of the carriage 20 as to accomplish the object just stated. The mirror is driven by means which is timed with relation to the movement of the carriage so that the position of the mirror bears a constant relation to the position of the carriage. To this end there are provided, in association with the guideways 34 for the carriage 20, rack bars 50 extending in parallel relation to each other and to the guideways 34. Meshing with the rack bars 50 are pinions 52 secured to opposite ends of a shaft 54 which also carries the rollers 32 at that end of the carriage 20. Secured to the shaft 54 at substantially its middle point is a bevel gear 56 (Figs. 5 and 6) arranged to mesh with a corresponding bevel gear 58 secured to a shaft 60 which at its other end is secured to the mirror 24 at a point corresponding to the transverse axis of the mirror. As shown, the mirror 24 is mounted not only on said shaft but also on a trunnion 62, both shaft 60 and trunnion 62 being mounted in suitable bearings slidably mounted on the upper surface of the carriage 20, to facilitate mounting of the mirror in the proper position on the carriage. It will be understood that the carriage starts its travel from a predetermined point at one end of the rack bars 50 and stops at a predetermined point at the other end of its travel, the arrangement being such as to provide a relationship in the movement of the carriage and of the mirror with respect to the work support such that the beam reflected from the mirror 24 travels successively along paths which coincide with the spaces 15 between the slats 14. From another viewpoint, it might be said that the mirror rotating means is geared to the work support so as to bear a constant relation to the slats which make up the work support.

Also mounted on the carriage 20, preferably by means providing for adjustment, is a tube 70 at the outer end of which is mounted the lamp 22, the tube being closed at the lamp end thereof and having at its other end a double convex lens 72 to direct a cone of light toward the mirror 24, the arrangement being such as to cause the mirror to reflect a bright beam of light down through an opening in the carriage floor to the work piece upon the work support 12. It is to be understood that the relationship between the rotation of the mirror and the travel of the carriage is such as to move the beam of light always in the same direction (such as, for example, from left to right as viewed in Fig. 3) along the spaces 15 between the slats 14 and the travel of the carriage during the idle part of the rotation of the mirror is such that the carriage is moved a distance which corresponds to the distances between the center lines of adjacent spaces 15. Since the carriage is traveling while the mirror is sweeping a beam along each space 15 it follows that the path of the beam along the space 15 bears a definite angular relationship, other than that of 90°, with respect to the longitudinal axis of the work support 12.

Since a leather work piece 30 is capable of reflecting light in all directions, it presents a diffused reflecting surface and the rays of light from such a surface are said to undergo diffused reflection. In the case of a patent leather surface, the reflected rays, originating from a beam sweeping over the surface in a vertical plane, will be massed in volume nearer to the vertical plane than in the case of a velvet or suede surface which is practically the other extreme as opposed to a specular surface. Hence widely reflected rays from any leather surface below the mirror 24 will be collected simultaneously by lenses such as those at 80 in all the units 26 and 28. The rays of light thus collected by the lenses 80 become in each case a beam of light which is directed by each lens into the window of its associated photocell 82 after passing through transparent portions of a screen 84 or 85 (Figs. 7 to 10, inclusive) interposed between each lens and its associated photocell. Preferably a type of screen like that shown at 84 (Fig. 7) is utilized in connection with the upper photocell units 26 while a screen like that at 85 (Fig. 8) is utilized in the lower photocell units 28. It will be noted that in both screens 84 and 85 there are alternately arranged bars or lines of transparent and opaque material. Hence, as the reflected beam of light passes lengthwise of the window in the photocell and lengthwise also of the screen positioned in front of said window, the said beam will be interrupted by the opaque bars and permitted to pass through the transparent bars with the result that impulses are produced in the electrical circuit or circuits in which the photocell is included.

Figure 9:
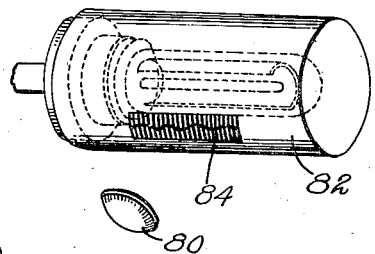
Fig. 9 is a view illustrating the relationship between lens, photocell and the screen of Fig. 7.
Figure 10:
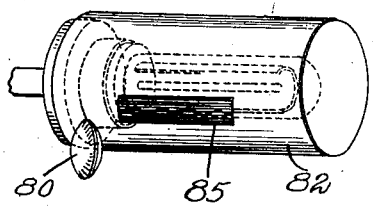
Fig. 10 is a view similar to Fig. 9 but showing the screen in Fig. 8.

If it be assumed, for instance, that the table 12 is 48 inches in width to accommodate the largest kid or calf skin likely to be presented for measurement, the screen 84 in front of the window of the photocells in the units 26 is preferably divided by 39 opaque bars alternating with 40 transparent spaces so that each time the light passes through a transparent space an impulse is created in the photocell and its circuit. If a given portion of the skin covered the full 48-inch width of the table there would, of course, be 40 impulses, one for each tenth of a foot of skin surface. On the other hand, a beam traveling along a line where the skin is substantially less than 48 inches in width would cause perhaps 30 impulses indicating a portion of the skin 36 inches in width, there being no impulses transmitted to the scanning unit after the beam drops off the edge of the work piece into the space 15 since there is no surface below or adjacent the space to reflect light. If there be one or more waves or ripples in the path of the beam, the line being traced on the screen 84 (Figs. 7 and 9) by a reflected beam will rise or fall on said screen but will cut across the same number of vertical lines or bars as a straight line would. It will be readily understood that the wavy lines shown on the screens 84 and 85 in Figs. 9 and 10 represent in each case the path of a beam across the screen. It will be seen that screen 84 is effective for the purpose of measuring across the skin to get the length of the projection of this portion of the skin whether or not this portion along the line traced by the beam be flat and/or wavy or rippled.

Figure 7:
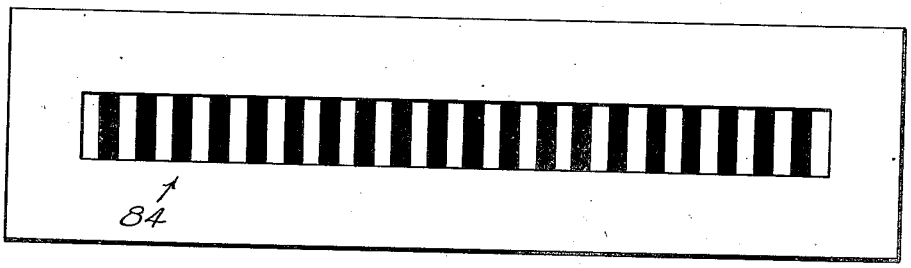
Fig. 7 is a diagrammatic representation of a screen to be used with the upper of the two photocells shown in Fig. 1.
Figure 8:
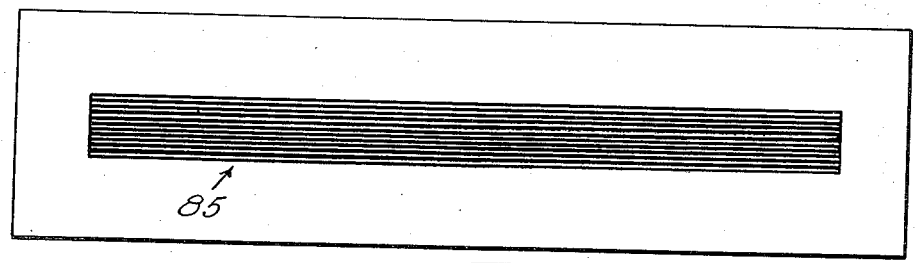
Fig. 8 is a similar view of another screen to be used with the lower photocell in Fig. 1.

At the same time that a beam is projected into the windows of the upper photocell units 26, a similar beam is projected into the windows of the lower photocell units 28 which are located rather low down so as more certainly to see any up and down movements of the beam as it travels across the work piece. It will be noted that the screen 85 (Figs. 8 and 10) has its lines drawn in parallelism with the surface of the work support so that the beam reflected from a wavy or rippled portion of the work piece may be reflected upon the screen and travel up and down over the horizontal lines thereof, in which case more lines will be crossed the higher the beam travels (which was not true in connection with the lines of screen 84) (Figs. 7 and 9). Each time that a line is crossed in screen 85 there is an impulse created in the associated photocell and its circuit, which impulses will be added up separately from those of the upper photocell units 26. At the end of the scanning operations the impulses counted and recorded in connection with screen 85 may be either added in by the operator or automatically added in by a suitably constructed delayed action circuit of a counter mechanism associated with the counter energized by the impulses originating at the screens 84.

Figure 3:
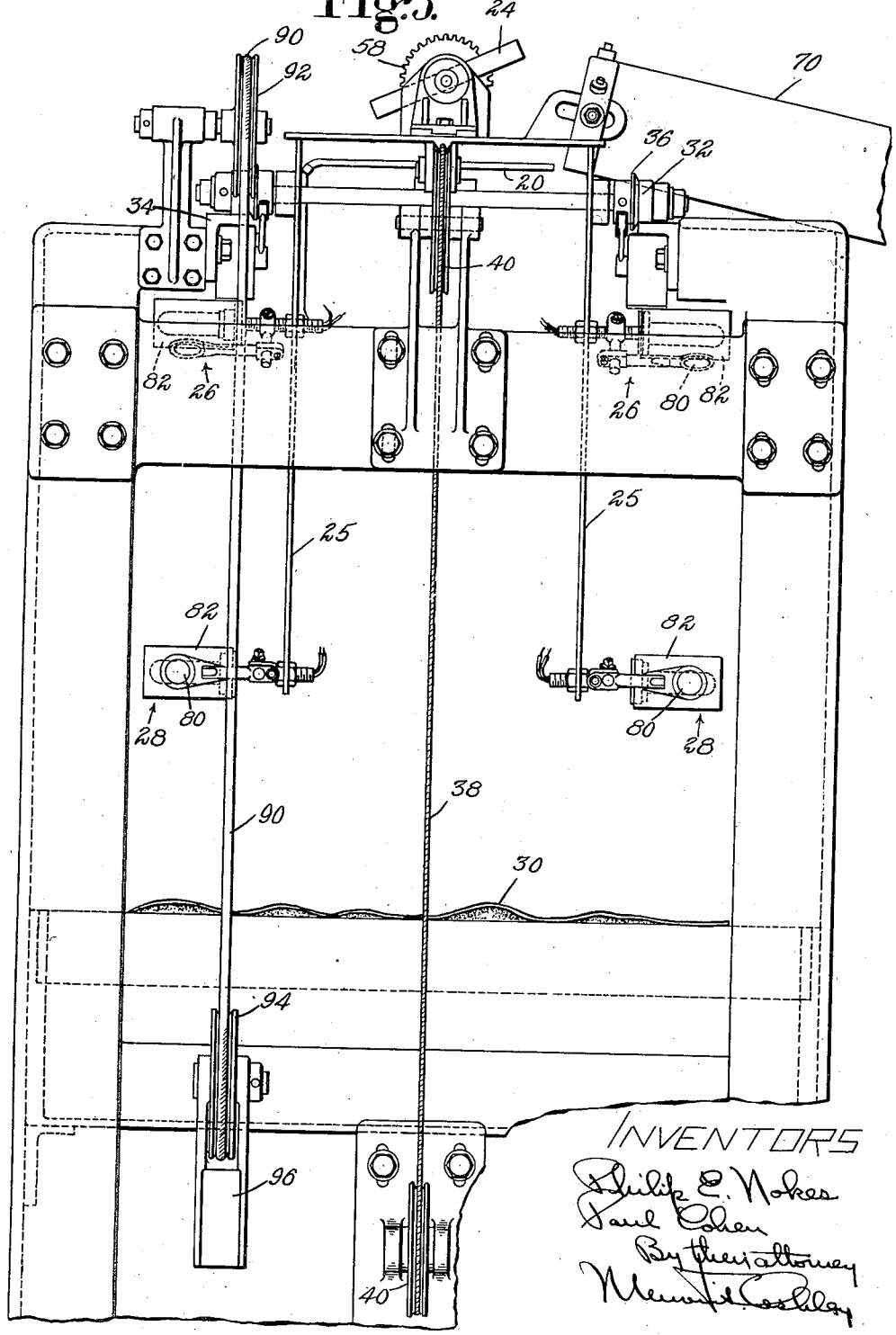
Fig. 3 is an end view looking from the left in Fig. 1, with the end wall of the cabinet omitted.

In order that reasonably priced lenses may be utilized in this scanning mechanism, it is proposed to provide two photocell units 26 and two photocell units 28, with their lens, positioned as shown in Figs. 3 and 4 about equally spaced with relation to the width of the table. It is to be understood that a single lens could be substituted for the two or more lenses previously described, provided said single lens had a sufficiently wide angular field of view to see the whole width of the work table, or providing said single lens is placed at a greater distance from the work supporting surface. This, however, is not a preferred construction, since it results in a machine of greater overall dimensions. In the illustrated construction, the screens associated with each pair of units 26 (or 28) must be so adjustable with respect to each other, as by micrometer-screws, that beams pass simultaneously through transparent spaces or bars in both screens and are obstructed simultaneously by opaque bars in both screens, it being understood in this connection that there is a certain amount of overlapping at the middle portion of the work piece where both lenses will gather light rays to project into their associated photocells. However, this does not increase the number of impulses but only the strength of each impulse where both photocells receive light rays from the same portion of the skin, since both photocells of units 26 (or of units 28) are in the same circuit. It follows that any width of work piece may be measured by increasing the number of photocell units in line widthwise of the work support.

For furnishing the necessary electrical connections for the scanning mechanism carried by the carriage 20, there is provided a cable 90 which is secured to the carriage and which passes over a grooved pulley 92 and then around a pulley 94 which carries a weight 96 sufficient to keep the cable 90 extended, the arrangement being such that the weighted pulley 94 provides a loop in the cable which becomes shorter or longer as the carriage travels back and forth along the racks 50. This cable leads to a counter mechanism conveniently housed in a box shown at 100 on the side of the cabinet 10.

Figure 11:
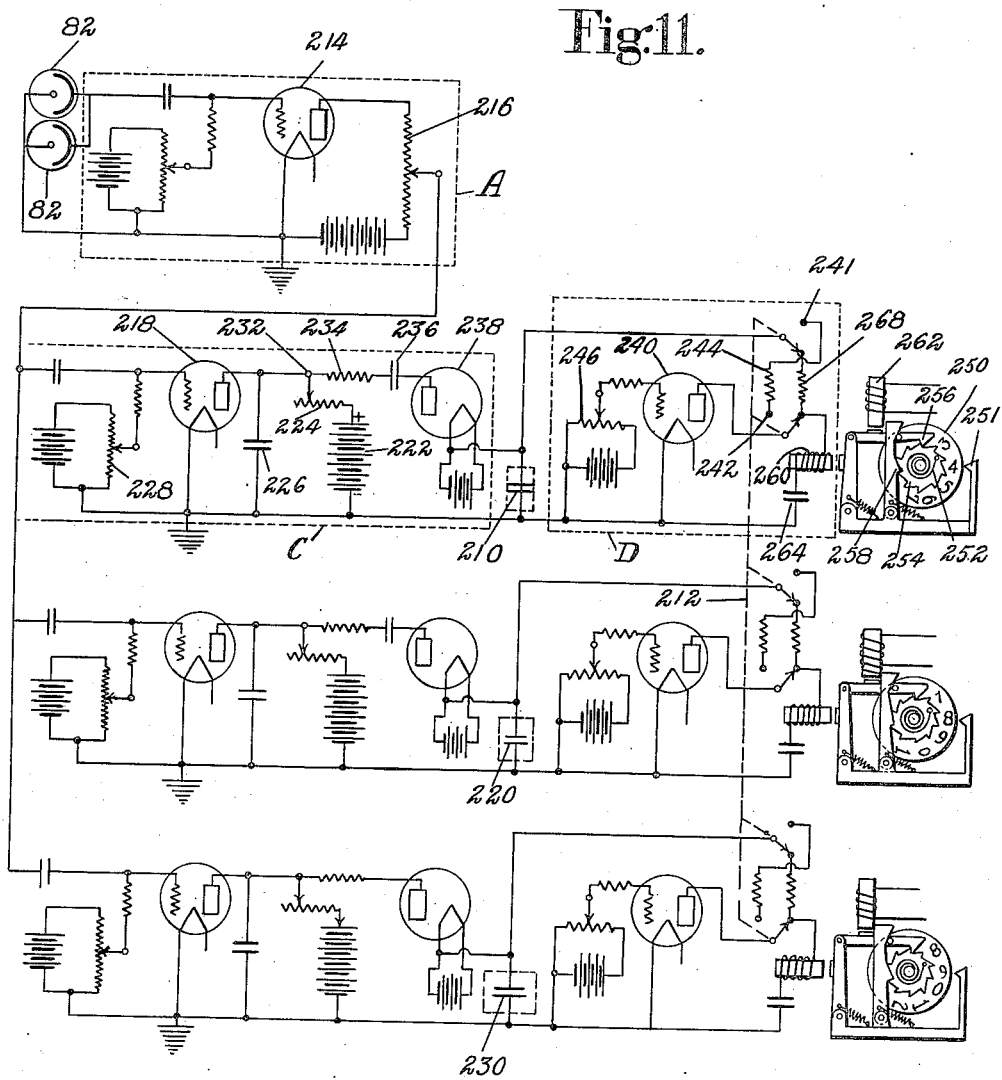
Fig. 11 is a diagrammatic representation of an electrical counter.

As heretofore pointed out, two scanning devices 26 (or 28) are provided for scanning crosswise of a work piece 30 on the work support 12, since in the illustrated machine the work support is of substantial width to take care of relatively large pieces of work including calf skins, it being recalled in this connection that glazed calf skins as well as glazed kid skins present full skirt portions which do not lie flat on a plane work supporting surface but, on the contrary, show wavy or rippled portions. As the scanning beam from the mirror 24 is reflected upwardly in various directions from the surface of the work piece 30, many rays of light are collected by the lens 80 associated with each photocell 82 and directed into the window of the associated photocell. During the first part of the travel of the scanning beam from left to right in Figs. 3 and 4, the photo-cell over the left part of the work support is the active element in the scanning operation while the photocell over the right side of the work support is the active element while the beam is passing beyond the median line of the work support to the right in said figures, it being altogether likely that both photocells receive rays of light from the middle portion of the work piece during the scanning movement of the beam in the described transverse path with respect to the work piece. For counting the impulses in the photocells, there is provided a counting mechanism such as that shown in Fig. 11 wherein the two photocells 82 of unit 26 or unit 28 are shown arranged in parallel so that, whether the impulses in the associated circuits come from one or both photocells, the counting is accurately performed, it being understood in this connection that when both photocells 82 receive interrupted light beams from the work piece that such reception results in the same number of impulses as if only one cell were receiving the scanning beam since the alternate opaque and transparent bars in the associated screens 84 (or 85) are accurately arranged with respect to each other. In other words, if both photocells in the scanning units 26 (or 28) receive light impulses, the energy transmitted through the photocells may be somewhat greater. There is greater intensity in the impulses but without any adverse effect in the counting operation.

As before stated, the area of a work piece is determined by counting the number of interrupted light beams passing through screens 84 or 85. The delivery of such beams, however, as by a scanning apparatus, is very rapid and the difficulty of mechanically counting such a series is overcome herein by an electrical arrangement in which the accumulating and carrying over usually performed mechanically is done electrically, requiring only the final setting of a group of independent figure wheels 250 to be done mechanically. This allows the setting of the figure wheels to be done after the scanning device has finished the measuring of a particular piece of work and, as a result, more time may be allowed for the mechanical operation of the figure wheels which, as will be later described, are not required in any case to move more than nine digits. To make this possible, a series of accumulating condensers 210, 220 and 230 has been provided to which are applied, simultaneously, unit charges corresponding in number to the impulses received from the photocell 28. These condensers may conveniently be so related in size or the factors of the discharge circuit may be so adjusted that the condenser 210 will discharge after receiving ten such charges, the condenser 220 will discharge after receiving one hundred unit charges, and the condenser 230 after receiving one thousand charges. This presupposes that a three-digit counting system will be sufficient to measure a desired count and that less than one thousand impulses will be received in so doing. For larger counts, it will only be necessary to provide further accumulating condensers and to associate with each of these a counter and co-operating circuits similar to those which will later be described. Each of the two condensers 210 and 220 will be discharged many times during the counting process and if we assume, for the sake of an example, that the final count is 984, then, at the completion of the count the condenser 210, having been filled and discharged ninety-eight times, will contain four units, the condenser 220, having been filled and discharged nine times, will contain eighty-four units, and the condenser 230 will contain nine hundred eighty-four units. In general then, the counters associated with these accumulating condensers will, on the discharge of them by throwing an operator-controlled gang switch 212 having a single operating member indicated by a dotted line, register the numbers nine, eight, and four. Then, after the reading of these figure wheels, the switch 212 may be returned to its initial position, the figure wheels reset and the apparatus put in condition for another counting operation.

Inasmuch as the impulses received from the photocell 82 are inherently weak, there have been associated with this cell one or more amplifying circuits such as the circuit A, of usual arrangement, in which the impulses of the photocell are delivered to the grid of a triode 214 the plate of which is connected to a resistance load 216. The change in voltage drop across this resistance 216, whenever an impulse is received from the photocell, is utilized to operate the novel electrical counter or register. A trigger or charging circuit C is associated with the accumulating condenser 210. Since the circuits associated with this and with the other accumulating condensers 220 and 230 are arranged to operate upon the same principle and differ only in electrical constants, the description will be restricted to one of these.

This charging circuit C is arranged as a conventional saw-tooth oscillator circuit employing a gas-filled arc-discharge tube 218, such as the argon-type tube #885 manufactured by the RCA Manufacturing Company, Inc. An arc-discharge tube of this type has a very low plate resistance when in the conducting state. If the grid is sufficiently negative, no plate current will flow but as soon as the grid potential is raised, i. e. rendered less negative, beyond a certain point, a gaseous discharge occurs and the grid loses control. Connected between the plate and the filament or the anode and cathode of this tube 218, are three parallel circuits, one of which includes a source of power, such as the battery 222 and its adjustable limiting resistance 224, another of which comprises a condenser 226, and another of which includes the accumulating condenser 210 connected to the plate circuit at the point 232 through a limiting resistance 234, a condenser 236, and a diode 238 operating as a one-way valve. The grid of the tube 218 is given a negative bias by a device 228 which is adjusted to give this bias such a value that the tube will not fire or become conductive until an additional impulse is received from the amplifier circuit A. The connection between these two circuits A and C is such that the change in voltage drop in the resistance 216, as a flash is received by the photocell, renders the grid of the tube 218 slightly more positive and causes it to fire and become conductive. Thereafter, a drop in the plate potential for only a few microseconds will be sufficient to stop the discharge of the tube, and the circuit will return to initial condition ready for a succeeding impulse. It will be understood that the time for each cycle of this trigger or charging circuit C must be a little less than the time between the successive impulses received from the photocell 82. Consistently with the name applied to the saw-tooth oscillator circuit C, the output of the circuit has a wave characterized by a more or less uniform and slow rise of potential to its maximum and a rapid drop of potential to its minimum. It is during this relatively slow rise of potential that, assuming that at each count is begun, the condenser 226 has previously been discharged to bring it back to a fixed charge which is not necessarily zero, a unit charge will be delivered from the source of power 222 to the condenser 210 and, incidentally, to the condenser 226. The action of the resistance 234 is to limit the charging rate of this accumulating condenser 210. The condenser 236 prevents a continued charging from the source 222 when no impulses are to be counted. The diode 238 prevents a reverse flow from the accumulating condenser 210 when the potential at the point 232 starts to fall. Between impulses from the circuit A, the potential at the point 232 will have been brought by the source 222 to a value slightly less than that necessary to cause the tube to fire and become conductive. If, then, an impulse is received from the amplifier circuit A, the negative grid bias is reduced, i. e. made more positive, and the tube 218 becomes conductive, permitting the condenser 226 to discharge through the anode-cathode circuit of the tube. The accumulating condenser 210, however, cannot discharge through this circuit because of the one-way valve afforded by the tube 238. As the condenser 226 discharges, there will be a drop of potential at the point 232 and, when it reaches a point below the de-ionizing potential of the gas in the tube 218, the grid of the latter will regain control and render the tube non-conductive. Thus, for every impulse received from either or both photocells 82, there will be a triggering of the tube 218, making it conductive, alternated with the delivery of a unit charge to the accumulating condenser 210.

Whenever, during this counting operation, the accumulating condenser 210 has received 10 unit charges, for example, provision is made for automatically discharging it in order that it shall be ready to count succeeding additional unit charges and, to this end, the apparatus is provided with a discharge circuit D employing a gas discharge tube 240 of a type the same as, or similar to that used in the charging circuit C. Assuming that the switch arms operated by the mechanism of the switch 212 have been moved to the points 241, 242, then it will be seen that one side of the condenser 210 is connected through a limiting resistance 244 to the plate or anode of the tube 240 and that the other side is connected to the cathode thereof. The grid of this tube is biased by a device 246 to such a value that the tube will become conductive whenever the ten unit charge as applied to the condenser 210 has raised the voltage thereon to a predetermined value. In the corresponding circuit associated with the accumulating condenser 220, the grid bias is so adjusted that the tube therein will only become conductive when one hundred unit charges have been received by that condenser, and, in the case of the condenser 230, a thousand unit charge would be necessary before the latter would discharge itself automatically.

Associated with each discharge circuit D is a frame having rotatably mounted thereon a figure wheel 250 of a common type having a reference pointer 251, a return spring 252, a ratchet 254, an advancing pawl 256, and a retaining pawl 258. The advancing pawl 256 is arranged to be operated by an electro-magnet 260 and can also be raised both to free itself and to cam off the retaining pawl 258, by means of a resetting magnet 262. In series with the advancing magnet 260 is a condenser 264 and a resistance 268. At the completion of the counting operation, the operator will throw the switch 212 to bring the associated switch arms into the position shown in the drawings, across the terminals of the resistance 268, thereby completing a registering sub-circuit. It will be recalled that at this time the condenser 230 contains the total number of unit charges received (assumed here to be less than one thousand) while the condenser 220 has a residual charge corresponding to the tens and units digits, and the condenser 210, a residual charge corresponding to the unit digit of the measured count. The transference of the residual charge on condenser 210 to the figure wheel magnet 260 is effected, unit by unit, by bringing this accumulating condenser 210 into a saw-tooth oscillator circuit including the electro-magnet 260, the condenser 264 and the resistance 268, serving as a counting or a registering sub-circuit. The accumulating condenser 210 will then act as a source of voltage and the constants of the circuit will have been so adjusted that one unit charge transferred from the condenser 210 is sufficient to trigger the circuit by raising the plate or anode voltage of the tube 240 to a point where it fires and becomes conductive. This discharge period will be accompanied by a flow of current into the condenser 264 which will energize the coil of the advancing magnet 260 and move the figure wheel 250 a step to bring the next number into view. If needed, one or more amplifier circuits may be interposed between the counting circuit and the coil of the mechanical register. As in the case of the charging circuit C, however, the condenser 264 will immediately discharge when its oscillator circuit reaches a predetermined maximum voltage and the tube 240 fires, and this discharge will be accompanied by a regaining of control of the tube 240 by its grid, the delivery of an additional impulse from the condenser 210 to the condenser 264 and so on until the unit charges on that condenser, 210, have been counted. It will be understood that at the same time the discharge circuit associated with the accumulating condenser 220 is oscillating and moving its figure wheel eight times (under the continued assumption that the count to be measured is nine hundred eighty-four), ignoring the residual four charges which are too small to move this particular figure wheel and, similarly, the discharge of the condenser 230 will move its figure wheel nine notches, ignoring the residual eighty-four charges. The figure wheels will then carry the resultant count. The switch 212 may then be returned to a position on the contacts 241, 242, ready for the next measurement. If desired, a switch (not shown) may also be utilized momentarily to energize the reset magnets 262, allowing the springs 252 to return the figure wheels to their initial position. It may also be utilized momentarily to short-circuit the accumulating condensers 220 and 230 so as to remove therefrom, for example, the residual eighty-four and four units respectively, thus leaving the apparatus in condition for the counting of the impulses received from the photocell tube 28 in another measurement.

As before indicated, there is one counter for the photocells of scanning units 26, and another counter for the scanning units 28. To obtain the final result, the figures shown on the two sets of figure wheels will be added together by the operator.

The electrical counter described above is fully disclosed and claimed in copending application Serial No. 408,229, filed August 25, 1941, in the name of Philip E. Nokes.

In operating the measuring machine shown in the drawings, a side wall of the cabinet is lifted to facilitate introduction of a skin in place upon the table 12, it being necessary only to throw the skin upon the table in a manner to spread it out reasonably and to leave it with no overlapped portions. A suitably spread-out skin is shown in Fig. 4, it being understood in this connection that it is futile to attempt to level any of the folds shown in the skin in this drawing since if a fold be pressed down upon the surface of the table, it will simply be transferred to another portion of the same skin. This is due to the fact that the skirt portions of the skin are fuller than the middle portion thereof along the backbone line and hence all portions of such a skin cannot be made to lie flat at the same time upon a flat supporting surface. As soon as the skin has been placed upon the work support 12, the cabinet is closed again and the travel of the carriage initiated by pressing upon a button opposite the word "Start" in Fig. 1. At the end of its travel toward the right the carriage automatically trips a switch (not shown) and comes to a stop. The operator then presses the button opposite the word "Reverse" and at the same time opens the cabinet to remove the piece of work which has just been measured and to introduce in place thereof another piece for measurement. When the carriage reaches its initial position at the left in Fig. 1, it stops and remains at rest until the cabinet is again closed and the starting button pushed.

Having described our invention, what we claim as new and desire to secure by Letters Patent of the United States is:

1. A machine for measuring sheet material having a plane surface comprising light means for tracing on said surface lines representing the intersections with said surface of equally spaced planes substantially normal to said surface, means above said surface for tracing on a screen images of these lines showing the approximate true length of the lines, and means associated with the means above the surface for measuring the total length of all lines shown on the screen.

2. A machine for measuring sheet material having plane surface portions comprising a mirror for projecting on said surface portions rays of light to trace the intersections with said surface portions of equally spaced planes substantially normal to said surface portions, means above said surface portions for tracing on a screen images of these lines showing the approximate true length of the lines, and means associated with the means above the surface portions for totalizing the length of all lines shown on the screen.

3. A machine for measuring sheet material having plane and warped surface portions comprising a mirror for projecting on said surface portions rays of light to trace the intersections with said surface portions of equally spaced planes substantially normal to said sheet material, means above said surface portions for tracing on a screen images of these lines progressively with their formation on the surface of the sheet material and showing the approximate increase in length of the lines due to the warp.

4. In a measuring machine, means for projecting a beam of light and causing it to move across a surface to be measured, a photocell and its associated electrical circuit arranged to respond to impulses received from said photocell, a lens for directing a reflection of said beam into the photocell, and a screen interposed between the lens and the photocell, said screen having alternately arranged opaque and transparent bars or lines to produce said impulses in the photocell and its circuit as said reflection moves across said screen and is alternately obstructed and transmitted to said photocell.

5. In a measuring machine, a source of light, means including a mirror to reflect a beam from such source of light to the surface of the work piece to be measured and to move it along parallel and equally spaced paths on said surface, a photocell, a lens for concentrating the beam of light reflected from the surface of the work piece and directing it to the photocell, a screen interposed between the lens and the photocell and having alternately arranged opaque and transparent bars or lines by which the light beam is alternately projected into the photocell and interrupted whereby impulses are produced in the photocell and its associated circuits, and means for counting such impulses to determine the area of said work piece.

6. In a measuring machine, scanning means including means for projecting a beam of light upon a work piece surface to be measured and causing it to move completely across said surface, a photocell in an electrical circuit, a lens for directing a reflection of said beam from said surface into the photocell, a screen interposed between the lens and the photocell, said screen having opaque and transparent bars or lines alternately arranged to produce impulses in the photocell circuit as said beam moves across the screen, means for causing relative travel between the said scanning means and the work piece, means to move the beam projecting means in properly timed relation to the rate of said relative travel between work piece and scanning means whereby the work piece is scanned along successive equally spaced parallel lines, and means to totalize the impulses as a measure of the work piece area.

7. In a measuring machine, a source of light, means including a mirror to reflect a beam from such source of light to the surface of a work piece to be measured and to move it along a path on said surface, a photocell, a lens to concentrate rays of light reflected from said path to produce a beam and to direct it into said photocell, a screen interposed between the lens and the photocell and having parallel opaque and transparent bars or lines alternately arranged in position above the surface to be measured and transverse to said path, the arrangement being such that as the last-mentioned light beam moves across the bars or lines on said screen impulses are produced in the photocell and its associated circuit, and means in said circuit for counting such impulses as a measure of the length of said path.

8. In a measuring machine, a source of light, means including a mirror to reflect a beam from such source of light to the surface of the work piece to be measured and to move it along a path on said surface, a photocell in an electrical circuit, a lens to direct the reflected beam of light into the photocell, a screen interposed between the lens and the photocell and having alternately arranged opaque and transparent bars or lines extending vertically across the window of said photocell by which the light beam is alternately interrupted and projected into the photocell, whereby impulses are produced in the photocell and its associated circuit, and means for counting such impulses as a measure of the length of said path.

9. In a measuring machine, scanning means including means for projecting a beam of light upon the surface to be measured and also a photocell in an electrical circuit to receive a reflected beam of light from the beam projected on said surface, a carriage for supporting said scanning means, a work support comprising a large number of spaced slats extending crosswise of the long dimension of said work support, means for causing relative traveling movement between said carriage and said work support, and means for operating said beam projecting means in timed relation to said relative movement of work support and carriage to cause the beam to be moved completely across the surface to be measured and successively between said slats where the latter are exposed, so that no light beam is reflected from the work support but only from the work piece.

10. In a measuring machine, scanning means including means for projecting a beam of light upon the surface to be measured and also a photocell in an electrical circuit to receive a reflected beam of light from the beam projected on said surface, a carriage for supporting said scanning means, a work support comprising a large number of spaced slats arranged at a slight angle to a line representing the shortest transverse dimension of said work support, means for causing continuous traveling movement of said carriage over said work support, and means geared to operate in timed relation to the movement of the carriage to operate said beam projecting means whereby said beam is caused to pass successively along the spaces between said slats so that no light beam is reflected from said work support but only from a work piece in place on said slats.

11. In a measuring machine, scanning means including means for projecting a beam of light upon the surface of a work piece to be measured and also a photocell in an electrical circuit to receive a beam of light reflected from the beam projected on said surface, a carriage for supporting said scanning means, a work support comprising a large number of spaced slats extending transversely to the long dimension of said work support and upon which the work piece is supported, means for causing relative traveling movement between said carriage and said work support, means operating in timed relation to said relative movement of work support and carriage to operate said beam projecting means to cause said beam to pass successively along the spaces between said slats where the latter and the spaces between them are exposed to the scanning beam, and a cabinet surrounding the work support and the scanning means, said cabinet having its lower part adjacent to said work support provided with light-absorbent surfaces designed to minimize the possibility of reflecting any light beam to the scanning means other than a beam from the surface of the work piece.

12. In an area measuring machine, a slotted support for a work piece to be measured, a carriage mounted for travel parallel to the support, a source of light, a rotatively mounted mirror, lens, screen, photocell and driver means carried by the carriage in such arrangement that the mirror is adapted to reflect a beam of light from the source of light along each slot of the slotted support where it may be reflected a second time by a work piece over said slot through the lens and screen and then to the photocell, the screen having alternately arranged opaque and transparent bars or lines arranged in such a way that the light beam reflected from the work piece above the slot may be alternately interrupted by the opaque bars to produce impulses in the photocell, the driver means being arranged to rotate the mirror in timed relation with the motion of the carriage to direct the beam of light only along the slots, and means associated with the photocell for counting the impulses as a measure of the work piece area.

13. In an area measuring machine, means for scanning an area of sheet material laid out on a support with a beam of light, a first photocell located a distance away from the support, a second photocell located nearer to the support, a lens and screen associated with each photocell whereby rays of the scanning beam of light after reflection from the sheet material are guided by each of said lenses through its associated screen and into its associated photocell, each screen having alternately arranged opaque and transparent bars or lines to produce impulses in its associated photocell, the bars of one screen being transverse to the direction of scanning and the bars of the other screen being arranged along the direction of scanning, the first photocell being arranged to receive rays reflected in a plane substantially normal to that of the support, the second photocell arranged to receive rays reflected in a plane at an acute angle to the support, and means associated with the photocells for totalizing the impulses in both photocells during the scanning operation as a measurement of the area.

14. In an area measuring machine, a support for sheet material the area of which is to be measured, means for scanning the sheet material with a beam of rays, a first set of lens, screen and photocell arranged to receive rays reflected from the sheet material in a plane at a large angle with the support, a second set of lens, screen and photocell arranged to receive rays reflected from the sheet material in a plane at a more acute angle with the support, each screen having alternately arranged opaque and transparent bars or lines to produce impulses in its associated photocell by means of rays passing through its associated lens, the bars of one screen being transverse to the direction of scanning and the bars of the other screen being arranged along the direction of scanning, the photocell of the first set receiving impulses corresponding to the projected length of scanning and the photocell of the second set receiving impulses corresponding to the warp, if any, of the sheet material, and means associated with the photocells for totalizing the impulses of the photocells as a measure of the sheet material area.

15. A method of measuring sheet material one surface of which has plane and warped portions which includes tracing by light rays on said surface lines representing the intersections with said surface of equally spaced planes substantially normal to the surface, tracing on screens images of these lines, as presented in different planes, measuring the horizontal component of the images on one screen and the vertical component of the images on another screen, and then adding the vertical and horizontal components as an approximate indication of the sheet material area.

16. A method of determining measurement of an area of a surface having warped portions that comprises the step of projecting a beam in a path extending entirely across said surface area in a single plane, receiving the beam as reflected from said path to a position outside said plane, integrating the units of rise and fall of the path as received at said position, and utilizing the information so obtained as a factor in the measurement of the surface area.

PHILIP E. NOKES.
PAUL COHEN.